United States Patent [19]

Bokon

[11] Patent Number: 4,719,743
[45] Date of Patent: Jan. 19, 1988

[54] NONHAZARDOUS MOWER

[76] Inventor: William S. Bokon, 6111 Geremander Ave., Rialto, Calif. 92376

[21] Appl. No.: 814,732

[22] Filed: Dec. 30, 1985

Related U.S. Application Data

[63] Continuation-in-part of Ser. No. 321,596, Nov. 16, 1981, Pat. No. 4,563,867, which is a continuation-in-part of Ser. No. 237,379, Feb. 23, 1981, abandoned, which is a continuation-in-part of Ser. No. 54,132, Jul. 2, 1979, abandoned, which is a continuation of Ser. No. 816,291, Jul. 18, 1977, abandoned, which is a continuation-in-part of Ser. No. 661,157, Feb. 25, 1976, abandoned.

[51] Int. Cl.$^4$ .............................................. A01O 34/42
[52] U.S. Cl. ........................................ 56/294; 56/249
[58] Field of Search .................... 56/7, 294, 249, 17.4, 56/229, 249.5, 251

[56] References Cited

U.S. PATENT DOCUMENTS

| | | | |
|---|---|---|---|
| 2,533,691 | 12/1950 | Renonte | 56/249 |
| 2,772,533 | 12/1956 | Shibley | 56/294 |
| 3,029,583 | 4/1962 | Patt | 56/249 |
| 3,054,247 | 9/1962 | Roester | 56/294 |
| 4,267,690 | 5/1981 | Pike et al. | 56/249 |
| 4,563,867 | 1/1986 | Bokon | 56/249 |

*Primary Examiner*—Robert Peshock
*Assistant Examiner*—John Weiss
*Attorney, Agent, or Firm*—John H. Crowe

[57] ABSTRACT

A lawn mower having a transverse cutting bar and a rotary cutter assembly fitted with a plurality of curved cutting edges that maintain substantially constant contact with the transverse cutting bar and reciprocate along the cutting bar to provide a shearing action for lawn mowing purposes. In the presently preferred embodiment of the lawn mower, the cutting edges are the edges of a plurality of generally elliptical blades mounted on a central shaft, the blades each having a longitudinal midsecton disposed at an angle of about 30° with the axis of the shaft so as to wobble along the transverse cutting bar as the cutter assembly rotates. The blades reciprocate along a portion of the length of the transverse cutting bar with their ranges of reciprocation overlapping to result in a smooth cutting swath. Each of the blades has cutting edges of generally S-shaped side profile, and is formed with symmetrical outturned flanges on each longitudinal half of such character as to insure substantially 90° contact between that blade and the transverse cutting bar throughout the full range of that contact.

4 Claims, 30 Drawing Figures

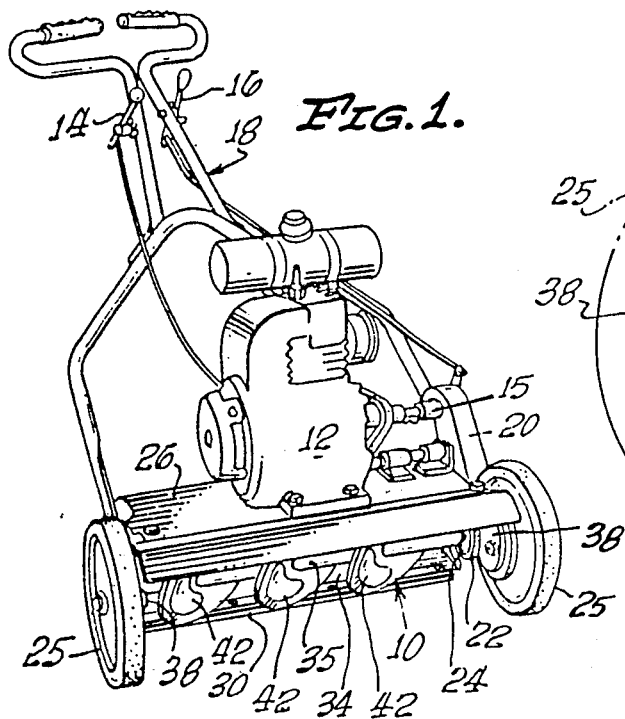

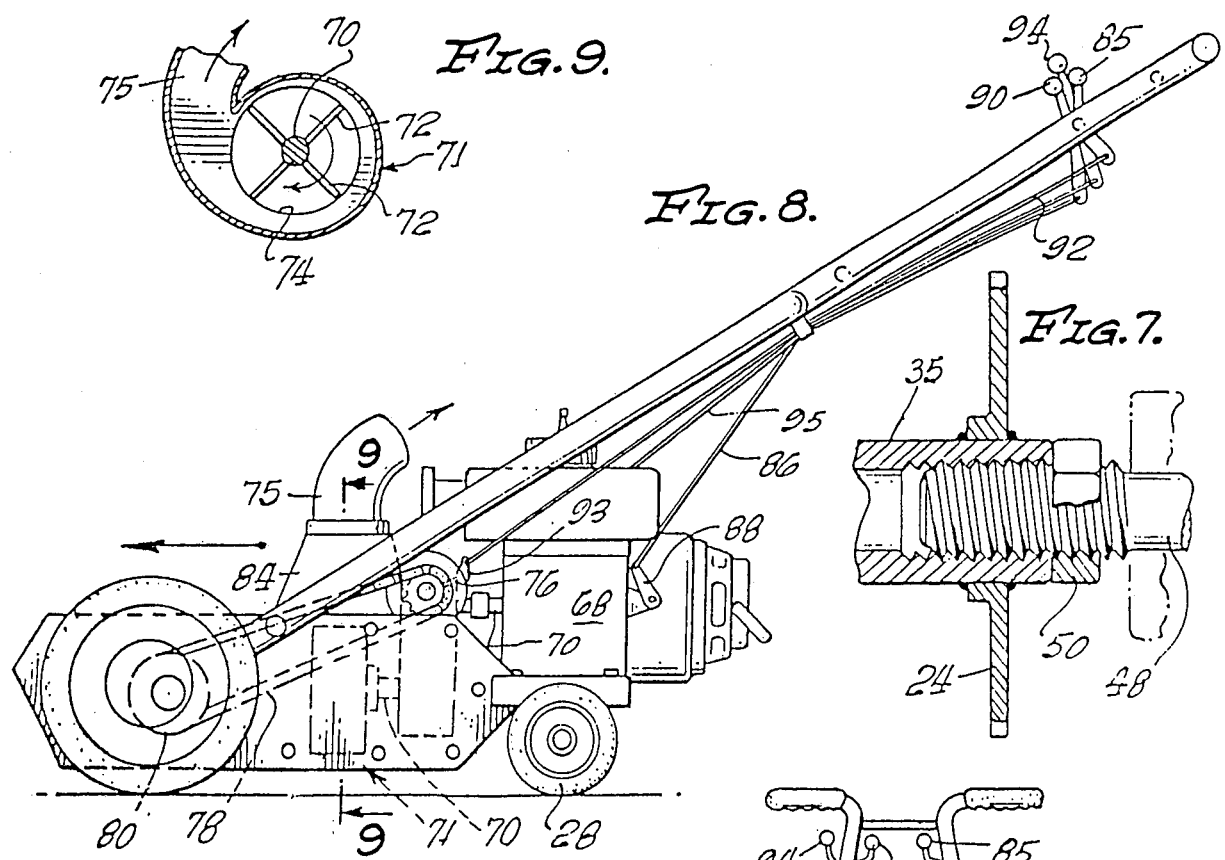

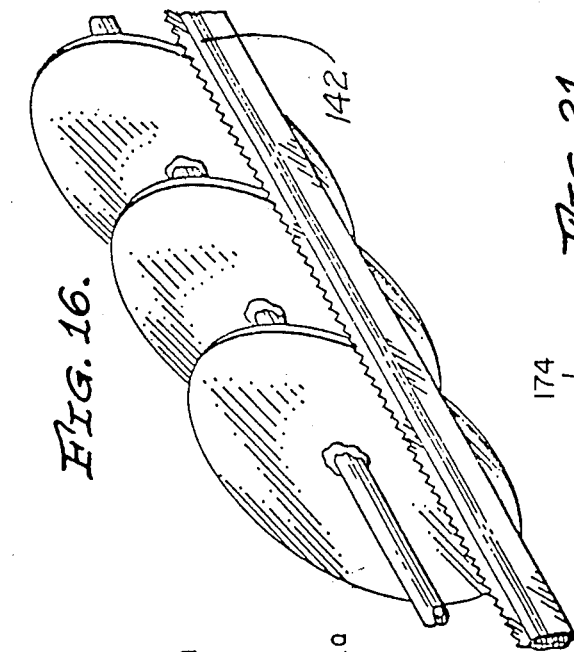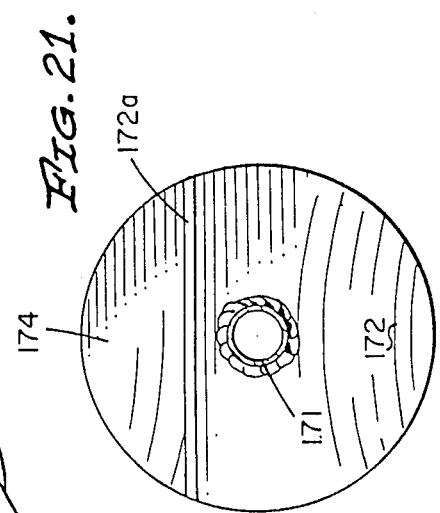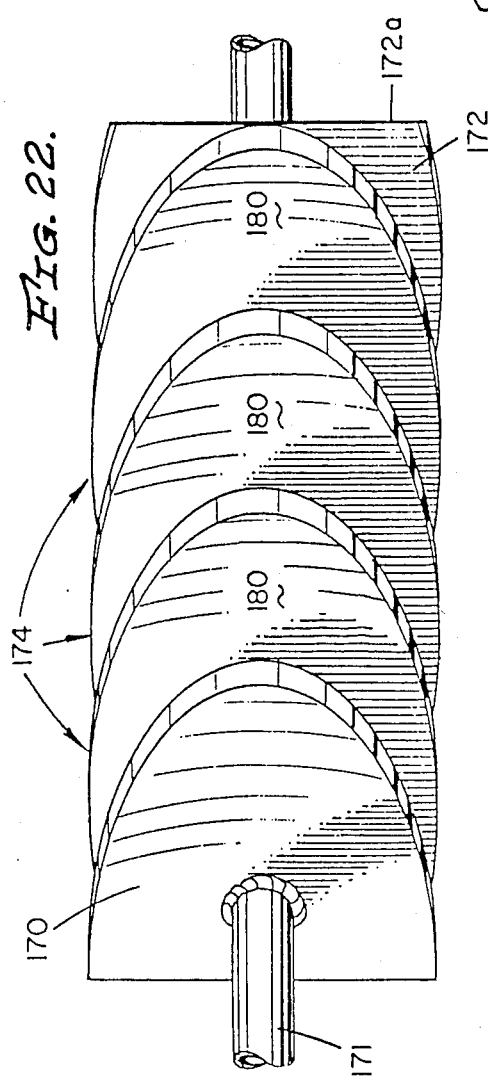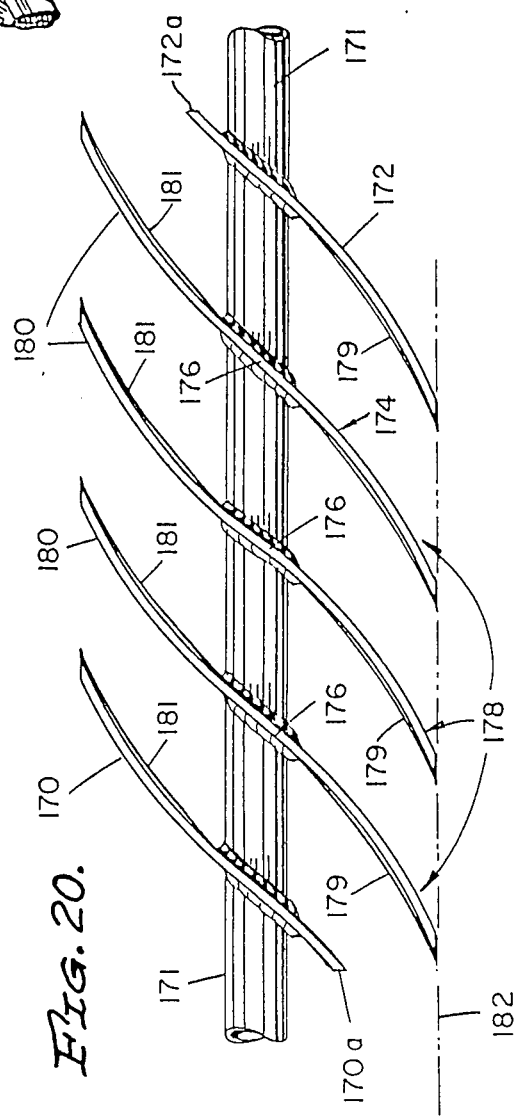

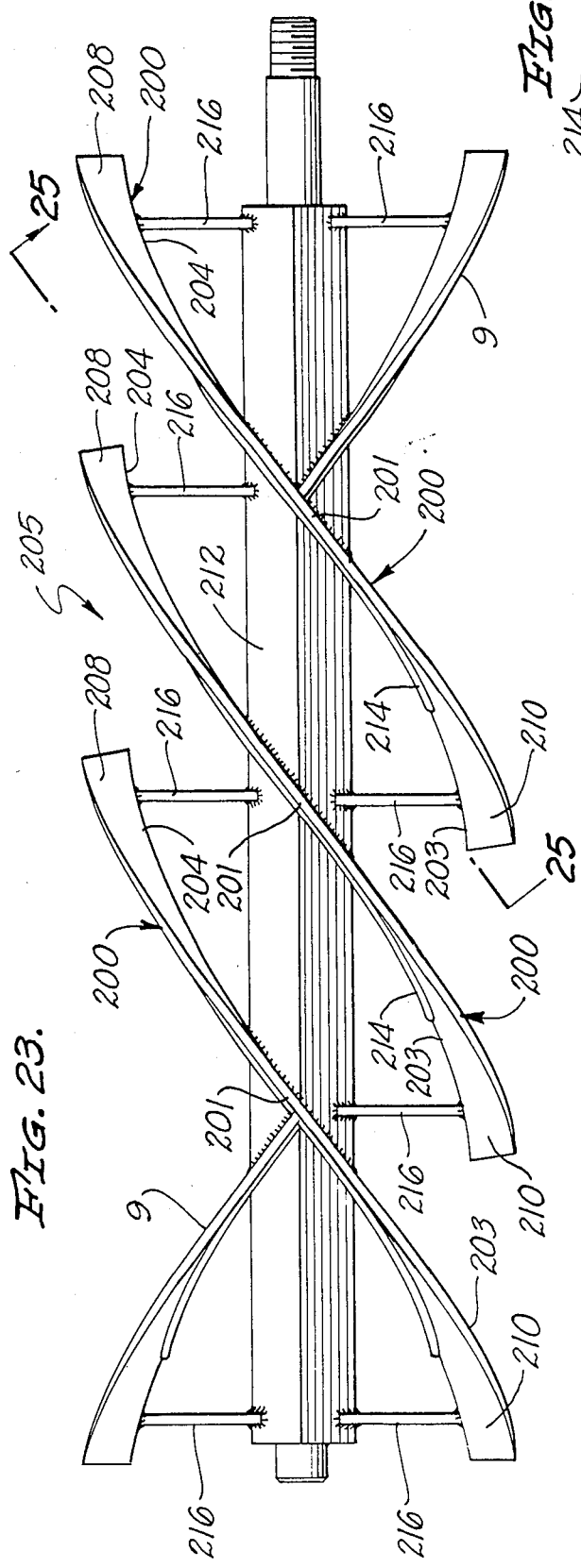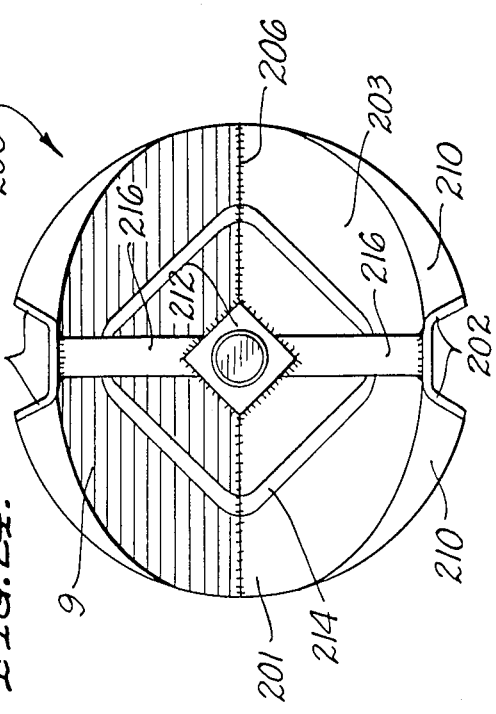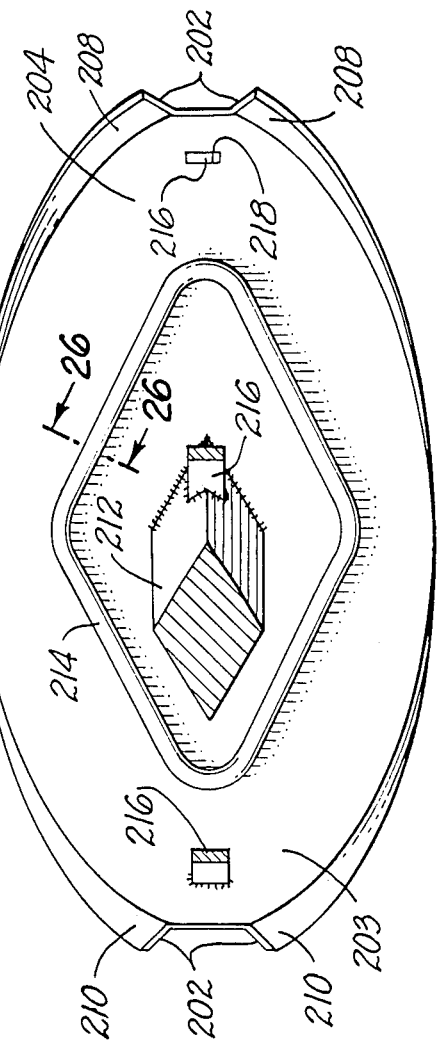

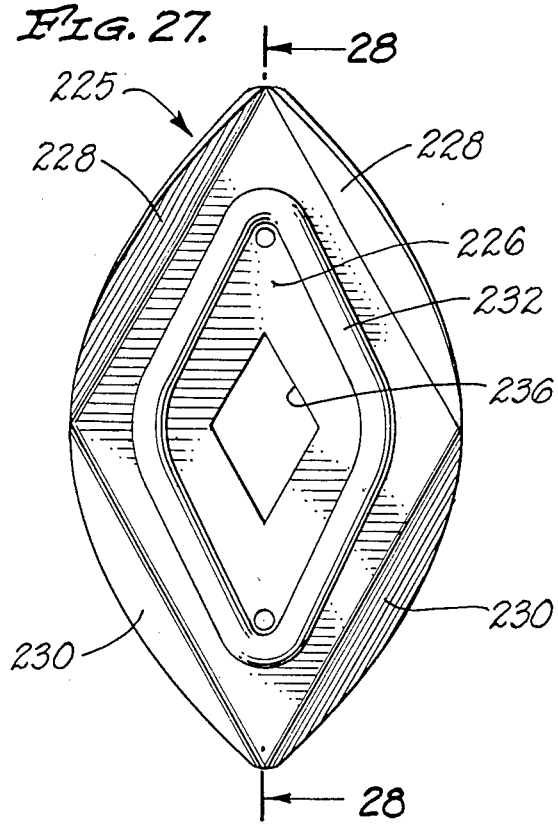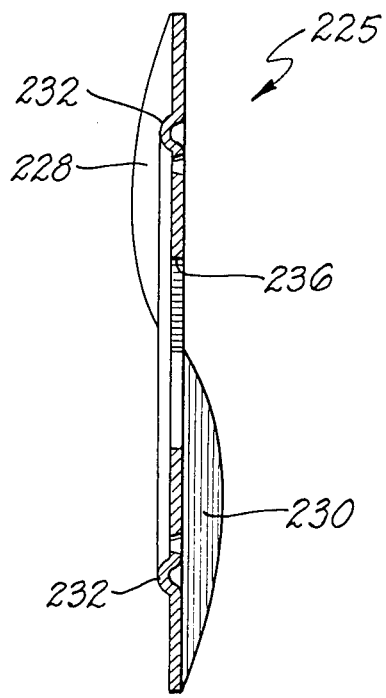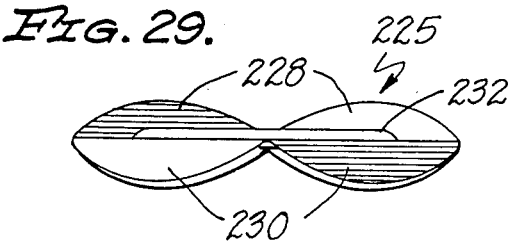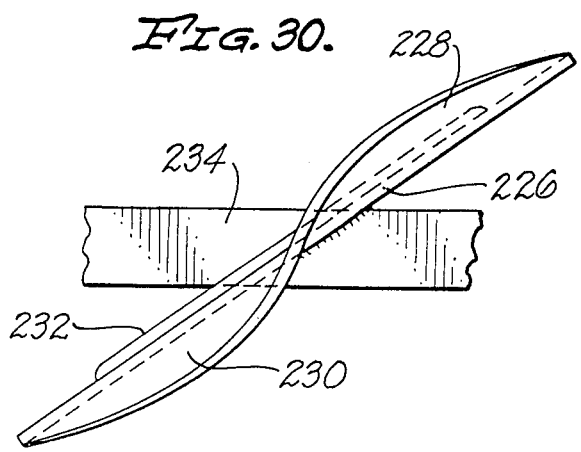

NONHAZARDOUS MOWER

CROSS REFERENCE TO RELATED APPLICATIONS

This application is a continuation-in-part of my copending U.S. application Ser. No. 06/321,596, filed Nov. 16, 1981, now U.S. Pat. No. 4,563,867 which is, in turn, a continuation-in-part of my U.S. application Ser. No. 06/237,379, filed Feb. 23, 1981, now abandoned. U.S. application Ser. No. 06/054,12, filed July 2, 1979, now abandoned. U.S. application Ser. No. 06/054,132 was a continuation of my U.S. application Ser. No. 816,291, filed July 18, 1977, now abandoned. U.S. application Ser. No. 816,291 was a continuation-in-part of my U.S. application Ser. No. 661,157, filed Feb. 25, 1976, now abandoned.

BACKGROUND OF THE INVENTION

This invention relates generally to lawn mowers, and more particularly to such mowers that differ from conventional lawn mowers in being free from any significant hazards to their operators.

In general, there are two types of lawn mowers, the reel-type and the rotary-type The reel-type mower has a transverse cutting bar at an adjusted cutting height and a cutter assembly in the form of a reel with peripheral blade elements that cooperate with the cutting bar in a scissor-like cutting operation. Inadvertent intrusion into the cutting zone of the operating cutting reel by a part of one's body can result in serious physical injury. Moreover, if the lawn mower encounters a foreign object such as, for example, a piece of wire, it can go out of control and injure the operator or a bystander.

The rotary-like mower employs a cutting blade that rotates at high speed in a horizontal plane at a selected mowing height. Although the rotating blade is normally enclosed by a shroud, injuries can result if it encounters an obstacle that causes the mower to jump or tilt. Should any part of a person's body come in contact with the rotating blade of such a mower, serious injury can result. Furthermore, objects are sometimes propelled from under the mower by the fast turning blade which can sever injure anyone struck by such an object.

From the foregoing, it is apparent that lawn mowers of presently conventional types are inherently dangerous and account for many serious injuries. Such injuries could be avoided by a lawn mower that operates in such fashion as to foreclose the potentially dangerous situations created by such conventional mowers.

SUMMARY OF THE INVENTION

The mower of this invention is similar to a reel-type mower in having a transverse cutting bar that cooperates with a rotary cutter assembly. It is substantially hazard-free in operation, however, because it has a different type of rotary cutter assembly and employs a different mode of cooperation between the transverse cutting bar and that assembly.

The rotary cutter assembly of this invention comprises a plurality, typically three, of axially spaced disks or blades on a common shaft, which disks are inclined at an angle to the axis of rotation and are of generally oval configuration in face view to wobble and thus reciprocate along portions of the transverse cutting bar. The ranges of reciprocation overlap to insure a neat mower swath. The term 'disk' is employed throughout this description to connote the cutter blades of this invention even though the blades do not fit within the literal definition of that term. This somewhat loose usage of the term is believed proper in view of the fact that no more suitable expression for the purpose suggests itself and because this choice of language, when construed in the light of the appended drawings and the present explanatory note, is believed to be free of confusion or ambiguity as employed herein. Since the disks operate as cutting blades in my rotary cutter assembly, those two terms (disks and blades) are used in a generally interchangeable sense, and sometimes in combination, in this disclosure.

The cutting blades of my rotary cutter assembly are of generally circular profile configuration as viewed along the axis of the shaft of the assembly. The cutting edges of the blades maintain substantially constant contact with the cutter bar and repeatedly shift along the latter, not only for the purpose of carrying out the cutting operation but also for the highly important purpose of pushing away from the cutting zone any part of a person's body that may inadvertently intrude into the zone.

An important object of the present invention is to provide a kit for converting a conventional reel-type mower into a mower having the hazard-free mode of operation described herein. The kit comprises my new type of rotary cutter assembly adapted to be substituted for a conventional reel-type cutter assembly. A feature of the invention in this regard is the provision of a cutter assembly with removable trunnions on its opposite ends. The trunnions may have external screw threads to fit into screw-threaded sockets on the opposite ends of the cutter assembly. Such trunnions may be selected from interchangeable sets of trunnions of different sizes to provide a rotary cutter assembly that may be journaled in the particular bearings of a particular conventional reel-type mower.

Another object of the invention is to provide a device which is summer can function as a lawn mower and in winter as a snow thrower to clear paths through snow. The cutter assembly loosens the snow and a blower projects the loosened snow away from the path of travel of the device. A suitable forward ramp may be added to scoop up snow that lies below the level of the transverse cutter bar.

A feature of the invention involves the provision of an independent control for the blower. It has been discovered that intermittent operation of the blower results in more effective disposal of grass clippings than continuous operation thereof. In addition, it has been found that permitting the grass cuttings to accumulate at the idle blower during the mowing of a swath permits periodic energization of the blower to deposit the accumulated cuttings at a selected site away from the area that is being mowed.

Still another object of the invention is to provide means for quickly and efficiently sharpening the cutting edges of the blades as desired. For this purpose, a special sharpening device is adapted to be temporarily mounted on the mower in a pivoted manner so as to be easily swung into contact with the cutting edges of the blades or disks.

These and other features and advantages of the present invention can be readily understood from the following detailed description considered in the light of the accompanying drawings.

BRIEF DESCRIPTION OF THE DRAWINGS

FIG. 1 is a perspective view of a mower constructed in accordance with the general concept of this invention.

FIG. 2 is a front elevational view of a rotary cutter assembly forming part of the FIG. 1 mower and showing, additionally, a fragmentary view of a transverse cutting bar adapted to cooperate with the cutter assembly.

FIG. 3 is a cross sectional view of the rotary cutter assembly and cutting bar, taken along line 3—3 FIG. 2.

FIGS. 4, 5 and 6 are diagramatic views illustrating how wobbling cutter disks forming a part of the rotary cutter assembly reciprocate along the transverse cutting bar.

FIG. 7 is an enlarged fragmentary sectional view showing how each end of the rotary cutter assembly may be provided with a removable trunnion.

FIG. 8 is a side elevational view of a mower equipped with a blower to convey grass cuttings away from the cutting zone.

FIG. 9 is a sectional view taken along line 9—9 of FIG. 8 illustrating the construction of the blower.

FIG. 10 is a front elevational view of the mower show in FIG. 8.

FIG. 11 is a side elevational view showing how the mower can be converted into a snow thrower.

FIG. 16 is a perspective view of the rotary cutter assembly and transverse cutting bar of a mower in accordance with this invention in which the cutting bar has a serrated edge, the position of the mower being such as to clearly reveal this edge.

FIG. 20 is a view showing, in front elevation, the blade pattern of another modified form of rotary cutter assembly in accordance with this invention.

FIG. 21 is a right end elevational view of the rotary cutter assembly blade arrangement of FIG. 20.

FIG. 22 is a top plan view of FIG. 20.

FIG. 23 is a front elevational view of another modified form of rotary cutter assembly in accordance with this invention.

FIG. 24 is a left end elevational view of the embodiment of FIG. 23.

FIG. 25 is a sectional view of the FIG. 23 cutter assembly, taken along line 25—25 of FIG. 23.

FIG. 26 is an enlarged, fragmentary sectional view taken along line 26—26 of FIG. 25.

FIG. 27 is a face view of a cutting disk of alternative design in accordance with this invention.

FIG. 28 is a longitudinal sectional view of the cutting disk, as seen along line 28—28 of FIG. 27.

FIG. 29 is a lower end elevational view of the cutting disk of FIG. 27.

FIG. 30 is a front elevational view of the FIG. 27 cutting disk mounted on a central shaft, the central shaft being shown fragmentarily.

DESCRIPTION OF THE PREFERRED EMBODIMENTS

Figure 12:
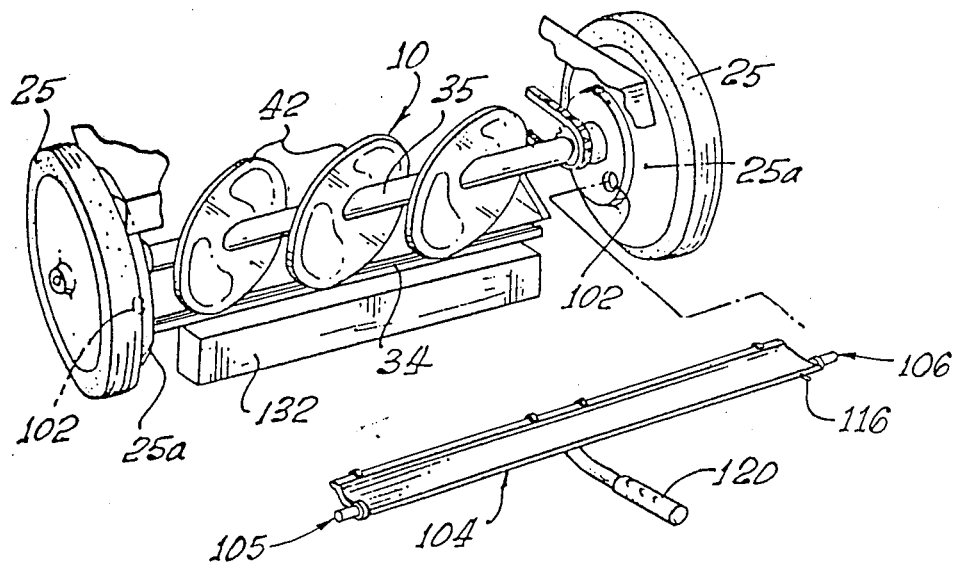
FIG. 12 is a fragmentary perspective view of the FIG. 1 mower showing, additional a separate sharpening device that can be temporarily mounted thereon for the purpose of sharpening the cutting edges of the mower blades.

The mower illustrated in FIGS. 1–6 is identical in large part to a conventional reel-type mower and therefore need not be described in much detail. It differs from a conventional reel-type mower in having a rotary cutter assembly generally designated by the numeral 10 in place of the reel-type cutter assembly found in the conventional mower.

In a well-known manner, an engine 12 on mower 10 is controlled by a throttle 14 operatively connected to the rotary cutter assembly 10 by a clutch 15 that is operated by a control 16 on the handle 18 of the mower. The clutch drives a sprocket (not shown) in a housing 20, which sprocket is connected by a sprocket chain 22 (FIG. 2) to a second sprocket 24 on the cutter assembly 10. The cutter assembly 10 is operatively connected by gearing (not shown) to two ground wheels 25 on the mower. The cutter assembly 10 and the ground wheels 25 rotate in the same direction.

The mower has a frame 26 supported in the usual fashion by the two ground wheels 25 and rearward roller means 28. A transverse cutting bar 30 is mounted by suitable cap screws 32 (FIG. 3) on a cross bar 34 of the frame 26. The cutting bar 30 is a conventional ledger plate or bed knife of the sort found on the conventional reel-type mower.

The rotary cutter assembly 10 has a tubular shaft 35, which is extended by stub shafts 36 that are journaled in the usual bearings 38 of a conventional mower. The two stub shafts 36, which are provided with suitable bushings 40, are operatively connected to the usual gearing (not shown) for driving the two ground wheels 25.

Rigidly mounted on the tubular shaft 35 are three spaced cutter disks 42 of generally oval or elliptical configuration. One end of each elongated cutter disk 42 is formed with a bevel 44 that is inclined in one direction, and the other end of the cutter disk is formed with a similar bevel 45 that is inclined in the opposite direction. The two bevels 44 and 45 merge in two diametrically opposite transition points 46, where the cutting edge of the disk is perpendicular to the plane of said disk. The cutter disks 42 are inclined at an acute angle to the axis of the tubular shaft 35, causing them to wobble in unison in response to rotation of the tubular shaft, and they are so shaped and dimensioned that the peripheral cutting edges of the cutter disks maintain continuous contact with the cutting bar 30.

FIG. 4 illustrates how the bevels 44 of the cutter disks 42 make contact with the transverse cutting bar 30 at one extreme tilt angle of the cutter disks. FIG. 5 shows intermediate positions of the cutter disks 42 as they shift toward their opposite extreme angles shown in FIG. 6. In FIG. 5 the transition points 46 of the three cutter blades make contact with the transverse cutting bar 30, and in FIG. 6 the bevels 45 of the three cutter blades make contact with the transverse cutting bar.

Mower 10 incorporates the concept of offset or dished halves of each disk or blade 42 so that the disk has somewhat cup-shaped recesses therein. In FIG. 4, the upper half of each disk 42 has an offset 47a to the right which forms a shallow recess facing left. In like manner, the bottom half of each disk has a leftward offset 47b which forms a right facing recess. As indicated in FIG. 5, each of the offset 47a and 47b extends over nearly 180° of the circumference of a disk. It should be noted that such recessed disks are not, of themselves, considered to be a patentably distinct feature of the invention claimed herein, but only one type of blade forming a part of certain mower combinations so claimed.

A feature of the invention is that it may be in the form of a kit for conversion of a conventional reel-type mower into a mower having my new mode of operation. The kit consists simply of a rotary cutter assembly on the order of rotary cutter assembly 10 that is adapted for replacing a conventional reel-type cutter assembly. For this purpose such rotary cutter assemblies having stub shafts like stub shafts 36 of different diameters can be stocked so that a rotary cutter assembly may be selected from stock to fit the receptive bearings of any particular conventional reel-type mower. Instead of stocking a number of different rotary cutter assemblies for this purpose, however, a single rotary cutter assembly model may be stocked with removable stub shafts that can be selected from interchangeable stub shafts of different sizes.

FIG. 7, by way of example, shows how the opposite ends of the tubular shaft 35 of a rotary cutter assembly may be internally screw threaded to receive externally threaded stub shafts 48 selected from various sets of stub shafts of different sizes. A lock nut 50 on each stub shaft 48 may be tightened against the end of the tubular shaft 35 for secure retention of the stub shaft.

The lawn mower of FIGS. 8, 9 and 10 has an attached blower, and is powered by an engine 68 with a forwardly extending shaft 70 (FIG. 9) that drives a well-known type of centrifugal blower 71 of the character indicated in FIG. 9. The shaft 70 carries a set of impeller blades 72 that extend across an axial intake port 74 to create an air stream that is discharged through a tangential outlet passage 75. The engine 68 is also operatively connected to gearing in a gear box 76 which actuates a sprocket chain 78 to drive a sprocket 80 on a rotary cutter assembly 51 on the mower. A suitable shroud 84 directs material from the cutting zone of the rotary cutter assembly 51 to centrifugal blower 71. The rotary cutter assembly is equipped with disks 42 (although these disks are not cupped as are their counterparts in the FIG. 1 mower, they are designated by like reference numerals for purposes of simplicity) which are provided with arrays 52a and 52b of resilient filaments to pick up leaves in the grass and flick them rearwardly to intake port 74 of the centrifugal blower.

The FIG. 8 apparatus has three manual controls, namely, a control knob 85, which is connected to the throttle 88 of the engine 68 as shown at 86; control knob 90 which, as shown at 92, is connected to a control lever 93 of a clutch and controls energization of the sprocket 80 of the rotary cutter assembly; and a control knob 94, which, as shown at 95, is connected to an arm 96 of a conventional clutch on the shaft 70 that controls energization of the blower 71.

The provision of the third control knob 94 for controlling the blower 71 independently of the rotary cutter assembly makes possible a mode of operation that is highly advantageous. It has been found that as the mower travels with the rotary cutter assembly energized and the centrifugal blower 71 de-energized by the clutch control 94, leaves and grass cuttings enter the shroud 84 to accumulate on the intake side of the blower 71. Thus the shroud 84 serves as means to accumulate and store grass cuttings and leaves as the mower cuts a swath of the lawn. When the mower reaches the end of the swath, the blower 71 can be energized by means of the control 94 to discharge the accumulated grass cuttings and leaves through the outlet passage 75. The outlet passage 75 can direct the entrained material into a pile or into a bag (not shown) that is connected to the outlet passage when the mower completes a swath. It has been found that this arrangement is not only highly useful in providing temporary storage for accumulated loose material, but also in greatly increasing efficiency in the discharge of loose material into the outlet passage 75.

FIG. 11 shows an embodiment which can function as a lawn mower in the summer and be employed as a snow thrower in winter. The construction of the apparatus there shown is largely similar to the construction of the embodiment shown in FIGS. 8–10, as indicated by the use of corresponding numerals to indicate corresponding parts. If such an apparatus is to be used as a snow thrower, however, the sprocket chain that drives the sprocket 80 in FIG. 8 is replaced by a simple train of gears (not shown) to connect the gear box 76 to the sprocket 80. This slight alteration is required because in the wintertime ice forms on a sprocket chain that is exposed to snow with the result that the sprocket chain is subject to breakage.

The only other change required to enable the apparatus to function as a snow thrower is the addition of a short sheet metal ramp 98, which scoops up the snow and lifts it to the level of the transverse cutting bar 30 to direct the scooped snow into the cutting zone of the rotary cutter assembly. The rotary cutter assembly loosens the snow to facilitate the directing of the snow into the blower 71, the blower serving the purpose of discharging the snow away from the path of the apparatus.

FIGS. 12 through 15 show how a blade sharpening device, generally designated 100, may be temporarily mounted on a mower of the present type for the purpose of sharpening its disk blades. To adapt the mower for the mounting of the sharpening device 100 requires the mere drilling of coaxial bores 102 in the two previously mentioned gear boxes 25a, respectively, with the common axis of the two bores parallel with the axis of the tubular shaft 35 of the rotary cutter assembly 10.

Figure 14:
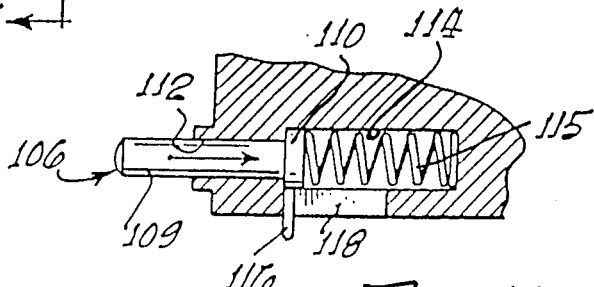
FIG. 14 is an enlarged fragmentary view, partially in section, showing the construction of a retractable trunnion of the sharpening device.

The sharpening device 100 has an enlongated body in the form of a metal plate 104 that is provided with two coaxial trunnions 105 and 106 at its opposite ends respectively to fit into the two coaxial bores 102. Trunnion 105 is fixed but trunnion 106 is retractable to make it possible to mount the sharpening device in the mower temporarily. As indicated in FIG. 14, the retractable trunnion 106 is in the form of a pin 109 having an enlargement or head 110 at its inner end. The body of the pin is slidably mounted in a bore 112 of the plate and the head 110 is slidably mounted and captured in a larger coaxial bore 114. A spiral spring 115 in the larger bore 114 acts against the head 110 to urge extension of the pin. A small rod 116 extends laterally from the pin 109 through a slot 118 in the plate 104 to make it possible to retract the pin manually in opposition to the spring 115.

The sharpening device 100 is provided with a rigid handle 120 by means of which it may be pivotally swung toward and away from the peripheries of the cutter disks 42. The metal plate 104 of the sharpening device has a longitudinal surface 122 for sharpening action on the cutting edges of the cutter disks and this surface is of cylindrical curvature, being a longitudinal section of a cylinder that is defined by the cutting edges. When the sharpening device is manually rotated into contact with the cutting edges of the blades the surface 122 conforms to the curvature of the peripheries of the cutter disks.

The surface 122 is provided with abrasive particles to abrade the cutting edges of the disks and the abrasive particles may be bonded to the plate 104 by a suitable resin. In this particular embodiment of the invention however, the abrasive particles are provided by what is commonly termed emery cloth in which the abrasive particles are bonded to a cloth backing. The abrasive particles can, for example, be particles of aluminum oxide or particles of carborundum.

Figure 15:
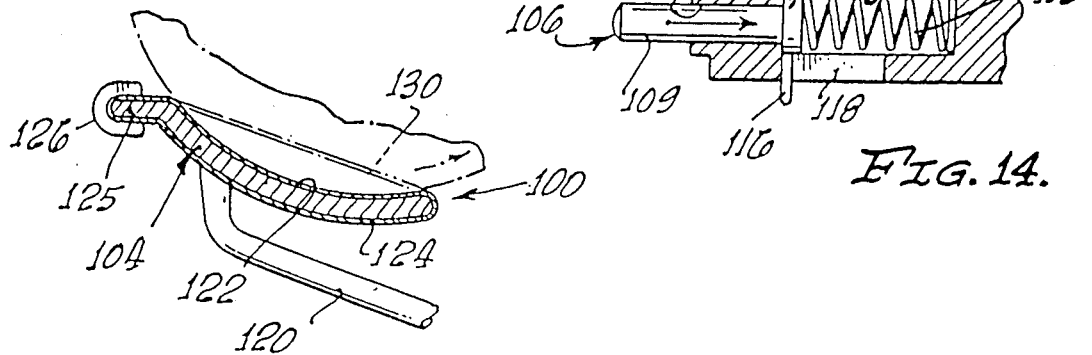
FIG. 15 is a sectional view taken along line 15—15 of FIG. 13 showing the sharpening device in effective contact with the cutting edges of the blades of the mower.

FIG. 15 shows the sharpening device in operating position against the cutting edges of the blades with a strip 124 of emery cloth folded around the plate 104. In the construction shown, the plate 104 has a longitudinal lip 125 on which suitable U-shaped spring clips 126 are removably mounted to anchor the opposite edges of the emery cloth 124. The lip 125 is shaped and dimensioned to position the spring clips 126 away from the cutting edges. The strip of emery cloth 124 is merely folded loosely around the plate 104 with the opposite edges of the emery strip engaged by the clips 126. Initially the emery cloth 124 may be spaced away from the cylindrically curved surface 122 of the plate 104 as indicated by the phantom lines 130 in FIG. 15. When the sharpening device is swung into contact with the cutting blades, however, the emery cloth is pressed into intimate contact with the cylindrically curved surface 122.

Figure 13:
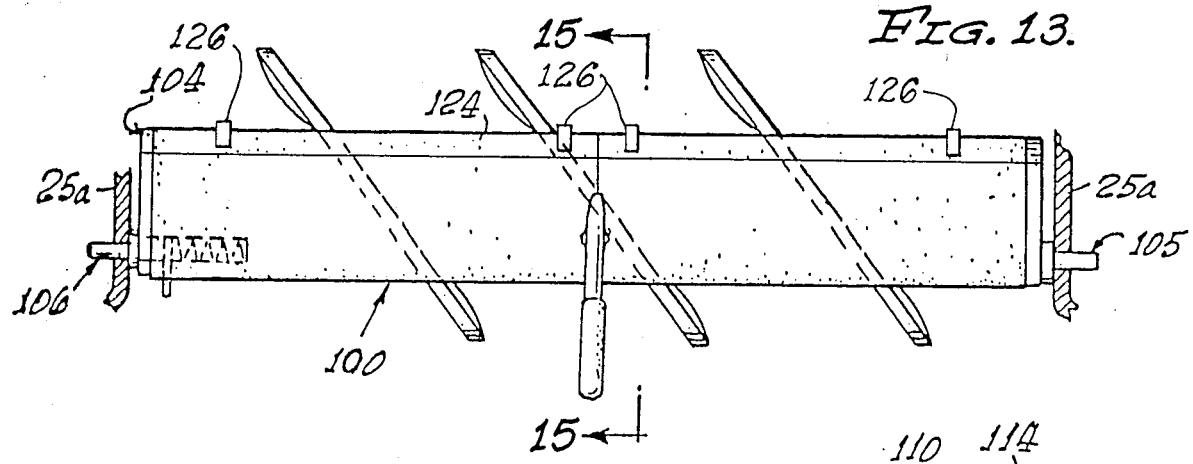
FIG. 13 is a fragmentary elevational view showing the sharpening device pivotally mounted on the fixed structure of the mower.

In the recommended sharpening operation, a coarse emery cloth 124 is employed to remove high points caused by nicks in the cutting edges of the blades. The coarse emery cloth is then removed and is replaced by finer emery cloth to carry out the sharpening operation proper. During the sharpening operation the wheels 25 of the mower are, of course, power driven but they are kept out of contact with the ground by elevating the mower by suitable means. FIG. 13 shows how a block of wood 132 may be employed for this purpose, the block being positioned under the crossbar 34 of the mower.

Where a cutter assembly such as that of any of the cutter disk embodiments so far described is concerned, there will be some ripple effect on the cut path at each side due to the fact that there is incomplete overlap of the reciprocation ranges of the end cutter disks. This is not particularly disadvantageous in the case of smaller mowers intended for domestic use in open areas because it is a simple matter to overlap the edge of each run in order to eliminate the ripple. Where the mower is used close to buildings, fences, and the like, however, it is not possible to eliminate the ripple effect without employing some other mowing or cutting means. In the case of larger, commercial mowers, moreover, this ripple effect is a more serious matter. Furthermore, particularly in the case of these larger mowers, there is a certain amount of imbalance in the blades of such a cutter assembly, which is hard on the bearings of their supporting shaft. I have determined that these shortcomings can be minimized by the attachment of a cutting element, shaped generally like the longitudinal half of a cutter disk, to the shaft of the assembly and transversely across each terminal cutter disk thereof. Each of these cutting elements is positioned to extend oppositely away from the shaft in symmetry with each half of the cutter disk to which it is attached. Where a pair of elements are so attached to the cutter assembly, there is complete overlap of the ranges of reciprocation of the end cutter disks along the cutting bar so that the assembly cuts a smoother path than it otherwise would. FIG. 23 shows a cutter assembly to be described in detail hereinafter fitted with such cutting elements, the latter being there illustrated at 9.

To insure a clean, even trim of lawn grass at its cutting bar elevation, my novel mower can be fitted with a serrated cutting bar. The serrations of such a bar catch and hold the grass blades so that they are clipped at the desired height, whereas a bar with a straight edge sometimes pushes the grass blades and causes them to be cut higher than that. FIG. 16 shows, at 142, a serrated cutting bar on a mower in accordance with this invention. Such a serrated cutting bar also insures a neat trim of ground covers other than grasses, such as, for example, dichondra, a popular ground cover in California.

Figure 19:
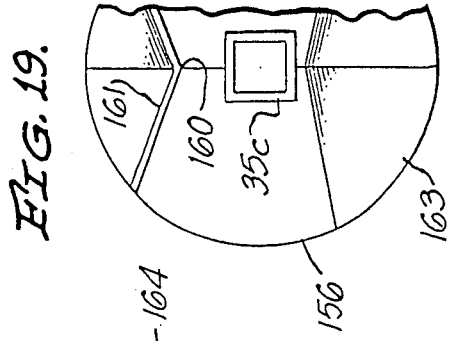
FIG. 19 is a fragmentary end view of the rotary cutter assembly of FIG. 17.
Figure 18:
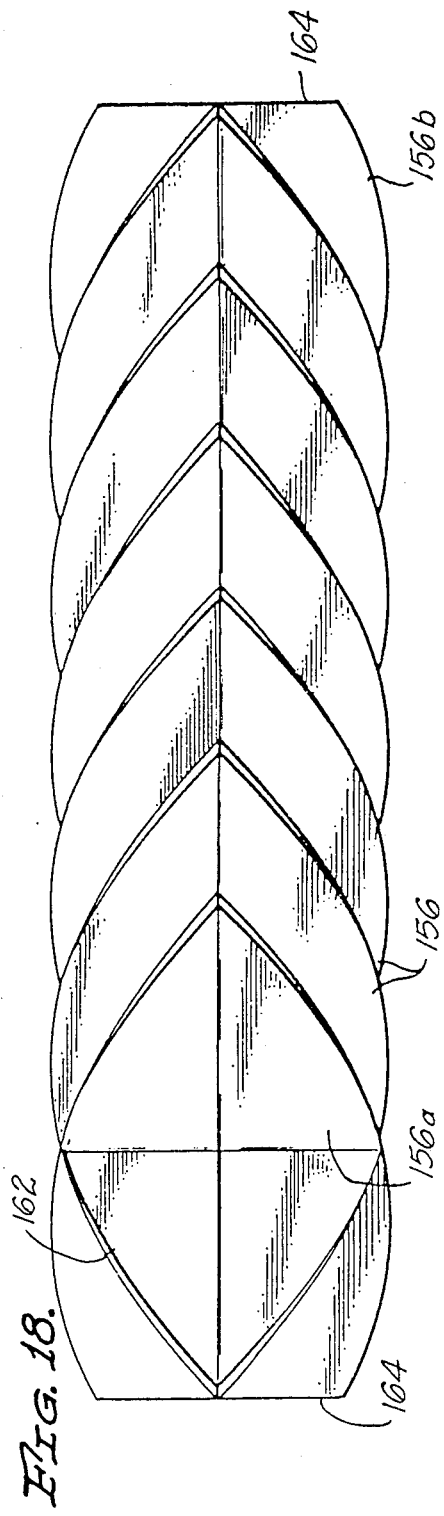
FIG. 18 is a top plan view of the rotary cutter assembly of FIG. 17.
Figure 17:
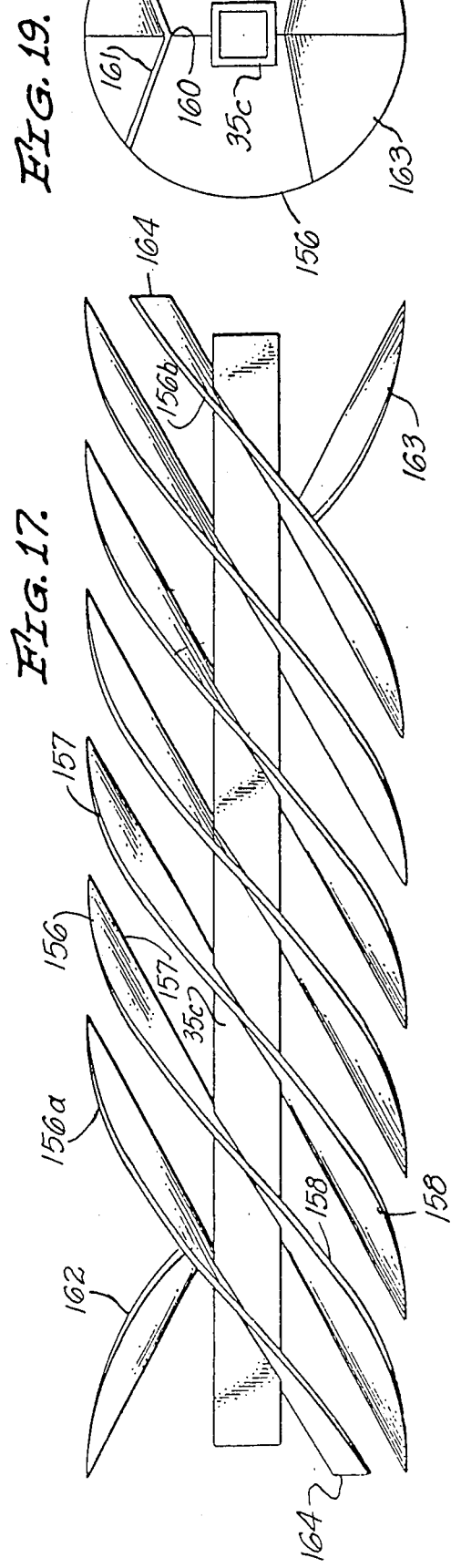
FIG. 17 is a front elevational view of a modified form of a rotary cutter assembly in accordance with this invention.

FIGS. 17 through 19 illustrate a modified form of my invention in which a number of cutting disks 156 are mounted on a square tubular shaft 35c. The square shape of the tubular shaft enables the cutting disks 156 to be mounted on the shaft in proper alignment with each other preparatory to being welded or otherwise secured to such shaft. Obviously, however, the shaft could be made round in cross section if desired. Shaft 35c is adapted to be mounted in a mower similarly to the way shaft 35 of FIG. 2 is mounted. Each disk has two segments, 157 and 158, disposed on opposite sides of the shaft 35c which diverge outwardly in flat planes 161 from a central ridge 160 (see FIG. 19). The disks 156 are equally spaced in relatively close relationship so that each disk overlaps at least three adjacent disks to insure an even cutting of grass or lawn cover without ripples. Oppositely disposed disk segments 162 and 163 are formed integrally with the end disks 156a and 156b at opposite ends of the FIG. 17 assembly. Such segments are the equivalent of end segments of the full disks and function in the same manner as the semi-disk segments 9 in FIG. 23, mentioned above, to insure an even cutting of grass or ground cover at the opposite sides of the swath cut by the disk assembly. It will be noted that the end disks 156a and 156b are cut off at their outer tips, as shown at 164, to insure complete overlap of all cutting edges around the opposite ends of the disk assembly.

Still another form of rotary cutter assembly in accordance with this invention is illustrated in FIGS. 20 through 22. This embodiment includes the usual tubular shaft 171, of round cross section in this instance, and has five cutting blades. These five blades include three disks 174 somewhat S-shaped in side profile, as seen in FIG. 20, and two end blades 170 and 172, which are truncated versions of the disks 174. Each of the blades 170 and 172 terminates at one end in a transverse edge (170a for blade 170 and 172a for blade 172) situated radially inwardly shaft 171, of the outer tip of the neighboring disk 174. This is to insure proper overlap of the cutting action of the cutter assembly blades throughout their cutting range.

Each of the disk 174 has a flat planar midsection 176 separating two oppositely curving sections 178 and 180. As will be observed, the sections 178 and 180 are curved in the longitudinal direction relative to the major disk axis, and also are slightly twisted, as can be seen at 179 and 181, respectively, on FIG. 20. The degree of longitudinal curvature of the section 178 is identical to that of section 180, but is opposite in direction thereto. The slight twists in section 178 and 180 are not critical to proper functioning of the disks and can be dispensed with if desired. The cooperative position of the edge of a cutting bar adapted for use with blades 170, 172 and 174 is indicated by phantom line 182 in FIG. 20.

After much experimentation with different blade shapes, I found an S-shaped curvature of the disks of my rotary cutter assembly to be highly effective for improving the cutting or shearing interaction between the disks and cutting bar of a mower through out the cycle of disk rotation and thereby imparting a neatly manicured appearance to a lawn. I have now achieved what I consider to be the ultimate S-shaped mower blade design, and constructed a prototype rotary cutter assembly with blades of that configuration. That rotary cutter assembly is illustrated at 205 in FIG. 23 and has three full blades 200 and the two previously mentioned half blades 9. Each of the blades 200, similarly to blades 174 of the FIG. 20 rotary cutter assembly, has a more or less flat midsection 201 and oppositely curving end portions 203 and 204, respectively. Unlike the blade 174 configuration, however, the blade 200 configuration differs in having outthrust peripheral flanges on each longitudinal half originating at its transverse diameter, as seen at 206 in FIG. 24, and increasing to maximum extension near the outer ends of the disk. A pair of the flanges extends longitudinally away from the transverse diameter 206 of each disk in mirror image symmetry in one direction and another pair extends longitudinally away from the transverse diameter in the opposite direction, one pair being shown at 208 and the other at 210 in FIGS. 23 and 25. As will be noted, each of the pairs of flanges 208 and 210 extend outwardly, away from the shaft, shown at 212, of the rotary cutter assembly. Also, each of the pairs of flanges 208 and 210 diverge from one another to their outer (cutting) edges, as illustrated at 202 in FIG. 24 and 25. These flange configurations and the S-shaped profile of blades 200 geometrically cooperate to insure 90° contact between the edge of a cutting bar on a mower and that part of each disk contacting said cutting bar at all points on the cutting edges of said disk. Except for small gaps at their tips, where the flanges 208 and 210 terminate, the disks have cutting edges around their entire peripheries.

In addition to their ability to produce smoothly-manicured surfaces on lawns, the S-shaped disks of this invention can, by virtue of their unusual curvature, be made relatively thin since that curvature helps preserve their structural integrity without the need of added thickness and consequent weight increase. Thus, such disks do not have to be as thick and heavy as their flat counterparts for adequate strength and rigidity, and this results in a significant reduction in blade manufacturing cost and a lighter weight mower with reduced energy (engine horsepower) requirements. More specifically, the S-shaped disks can be formed from metal sheet stock only ⅛-inch thick, by contrast with flat disk blades which were found to require thicknesses of from 1/16- to ¼-inch to give them adequate strength and rigidity for their intended purpose. To give the S-shaped blades 200 of rotary cutter assembly 205 additional strength and rigidity, each is provided with a diamond-shaped corrugation 214, best shown in FIG. 25. Shaft 212 is of square cross-sectional shape to insure proper alignment of the disks 200 thereon and a pair of metallic braces 216 help to hold each of the disks 200 rigidly in place in the assembly. Each of the braces is welded at its inner end to the shaft 212, as illustrated in the drawings, and weldably secured in an opening 218 in an adjacent disk. Two more braces 216 support the half-disks 9 in the manner shown in FIG. 23. Both the disks and half-disks are welded to the shaft 212, as illustrated in FIGS. 23–25.

The disks 200 are mounted on shaft 212 with their midsections at an angle of 30° with the axis of the shaft. I have found 30° to be the best angle for giving a grass lawn a neatly manicured appearance, although the disk angle can vary between about 25° and 35° for generally satisfactory performance on well-kept lawns. The disk angle can exceed that range for use on weeds, rough terrain, etc., where a bending and grinding of weed stems, and other rank growth, can be tolerated without aesthetic objection. In this connection, a practical overall range of disk angles for purposes of this invention is from about 25° to about 41°.

I have field-tested a prototype mower with a rotary cutter assembly such as cutter assembly 205 several times under extremely difficult environmental conditions. In one such test, the mower was used to cut a thick, rank growth of St. Augustine grass, a variety of lawn grass popular in Florida and found in other sunbelt regions of the United States. Its growth habit is such as to produce a tangled mat of tough, coarsebladed stolons or runners, typically referred to as thatch, which offers great resistance to the cutting operation of conventional mowers, particularly those of the reel type, even when the grass is frequently mowed. St. Augustine grass grows rapidly in hot weather, and when it is well-watered and fertilized and mowing is neglected for even a relatively short period of time at hot summer temperatures, it becomes a difficult obstacle course for even a high-powered rotary mower. I tested my prototype mower on such an overgrown lawn with a high stand of grass, and observed that it worked its way through the tall grass and thatch with seemingly little effort. Moreover, during this mowing operation, I set the mower so low that it actually scalped the lawn, cutting the grass down to ground level, a feat that would have been impossible with a mower of any other known type.

During the above-described mowing operation, the S-shaped cutter disks of my novel mower kept grass clippings and debris clear of the cutting bar, thereby permitting the cutter assembly of the mower to travel through the grass without any build-up of matted clippings or the like in the cutting area. My mower was powered by a Briggs and Stratton gasoline engine of only 2.5 horsepower. A reel-type mower would have required a high horsepower engine for the mowing of such a lawn, and even then would be vulnerable to stalling because of the large volume of grass clippings generated by the mowing operation and the tendency of such clippings to build up in the cutting area and interfere with the operation of the reel. A rotary mower would likewise require a much more powerful engine than my mower had (and a blade speed on the order of 5,000 rpm) for use on the above-described St. Augustine lawn. When St. Augustine grass is green, healthy and overgrown, its clippings have sufficient moisture to pack together on mower parts and compound the difficulties of any mowing operation with conventional equipment. Anyone who has ever attempted to mow a heavy growth of St. Augustine grass with a conventional mower of any type can appreciate the remarkable achievement of my mower in cutting its way through such grass with such seemingly effortless ease and lack of stalling difficulties.

FIGS. 27 through 30 show a modified form 225 of a cutter disk blade for my rotary cutter assembly. This blade has a main body portion 226 of generally flat shape divided into an upper half, as seen in FIG. 27, characterized by a pair of upturned symmetrical flanges 228 with arcuate peripheral edges extending from the transverse diameter of the disk to its upper tip, and a lower half having a pair of downturned symmetrical flanges 230 with similarly arcuate peripheral edges extending from the transverse diameter of the blade to its lower tip. Disk 225 has a diamond-shaped corrugation 232 to stiffen and strengthen its structure and is adapted for installation on a rotary cutter assembly shaft of square cross-section such as shown fragmentarily at 234 in FIG. 30. For that purpose the disk has a diamond-shaped center aperture 236, as shown in FIG. 27.

As will now be apparent, my novel mower invention can take any of a number of forms. It can, for example, be embodied in lawn mowers of any type, commercial or otherwise, including large mowers with gangs of rotary assemblies of the sort used on golf courses, school grounds, parks and other areas of large expanse. Mowers in accordance with this invention can be powered in any suitable fashion, and can vary in size from small hand-powered lawn mowers to the largest commercial machines driven by gasoline, hydraulic, or other power means. Any blade or disk design within the scope of my invention can be employed in either the completed mower or conversion kit described herein. Likewise, any number of cutter blades or disks suitable for the purpose can be employed on my novel rotary cutter assembly within the scope of the invention The addition of spines in the form of fins or ribs to the cutter blades or disks to enhance their versatility for use in snow thrower embodiments of my invention also falls within the scope of the invention.

While selected embodiments of my invention have been described and illustrated in detail herein, it should be understood that the invention is not limited to those embodiments but is commensurate in scope with the language of the following claims.

I claim:

1. A mower having a frame mounted on ground wheels, a transverse cutting bar mounted on the frame at a selected cutting height above ground level and a rotary cutter assembly cooperative with the transverse cutting bar for mowing purposes;

said rotary cutter assembly having a plurality of peripheral cutting edges of generally circular profile configuration, as seen along the axis of the rotary cutter assembly, spaced along the transverse cutting bar;

said peripheral cutting edges being the edges of a plurality of separate disks, each of said disks being of elongated configuration and having a longitudinal transitional midsection between integral, longitudinally flanking, nonplanar end sections whereby its cutting edge configuration is of generally S-shaped side profile, said midsection being longitudinally disposed at an angle within the range of from about 25° to about 41° with the axis of rotation of said rotary cutter assembly to wobble, and thereby cause the peripheral cutting edges to reciprocate, along the cutting bar in response to rotation about said axis;

the spacing of said disks being such that the ranges of reciprocation of their peripheral cutting edges along said cutting bar overlap;

whereby said peripheral cutting edges shift along the bar in response to rotation of the rotary cutter assembly in such a way as to make the cutting operation nonhazardous by pushing away from the cutting zone any part of the operator's body that may inadvertently intrude thereinto.

2. A mower in accordance with claim 1 in which said end sections of each of said disks curve away from its midsection in opposite directions to give the cutting edge configuration of that disk said generally S-shaped side profile.

3. A mower in accordance with claim 2 in which each of said disks has a pair of outthrust peripheral flanges on each longitudinal half, said flanges originating at about its transverse diameter and increasing to maximum outthrust extension near the outer ends of the disk, one pair of the flanges extending longitudinally away from the transverse diameter of the disk in mirror image symmetry in one direction and the other pair extending longitudinally away from said transverse diameter in the opposite direction, each of the pairs of flanges diverging from one another toward their outer edges, whereby each disk makes contact with said cutting bar at all points of contact therebetween at an angle of substantially 90°.

4. A mower in accordance with claim 3 in which said angle of the midsection of each of said disks with the axis of rotation of said rotary cutter assembly is within the range from about 25° to about 35°.

* * * * *

UNITED STATES PATENT AND TRADEMARK OFFICE
CERTIFICATE OF CORRECTION

PATENT NO. : 4,719,743
DATED : January 19, 1988
INVENTOR(S) : WILLIAM S. BOKON

It is certified that error appears in the above-identified patent and that said Letters Patent is hereby corrected as shown below:

Column 1, line 11, "06/054,12" should be --06/054,132--; and line 44, change "sever" to --severely--. Column 2, line 40, change "is" to --in--. Column 3, line 12, insert --of-- before "FIG. 2"; and line 30, "additional" should be --additionally,--. Column 8, line 65, change "inwardly shaft" to --inwardly, toward shaft--. Column 9, line 1, "disk" should be --disks--; line 9, "section" should read --sections--; and line 18, "through out" should be --throughout--.

Signed and Sealed this

Nineteenth Day of December, 1989

Attest:

JEFFREY M. SAMUELS

*Attesting Officer*      *Acting Commissioner of Patents and Trademarks*